No. 781,781. PATENTED FEB. 7, 1905.
W. A. MILNE.
COMPRESSING WHEEL FOR PRESSES.
APPLICATION FILED NOV. 25, 1903. RENEWED OCT. 31, 1904.

No. 781,781.

Patented February 7, 1905.

UNITED STATES PATENT OFFICE.

WILLIAM ATKINSON MILNE, OF BROWN'S CORNERS, CANADA.

COMPRESSING-WHEEL FOR PRESSES.

SPECIFICATION forming part of Letters Patent No. 781,781, dated February 7, 1905.

Application filed November 25, 1903. Renewed October 31, 1904. Serial No. 230,827.

*To all whom it may concern:*

Be it known that I, WILLIAM ATKINSON MILNE, of the village of Brown's Corners, in the county of York, in the Province of Ontario, Canada, have invented certain new and useful Improvements in Compressing-Wheels for Presses, of which the following is the specification.

My invention relates to improvements in peat-presses, and particularly to those in which the circumference of wheels is used in compressing peat into blocks; and the object of the invention is to devise a simple form of wheel whereby a perfect unchecked block of equal density throughout may be produced; and it consists, essentially, of two wheels, one of which is provided with an arc-shaped recess or recesses to form the arc-shaped side of the block and the other wheel of which is provided with a coacting circumferential portion or portions which form substantially the chord of the arc of the recess in the other wheel and produces the substantially straight side of the block, as hereinafter more particulary explained.

Figure 1:
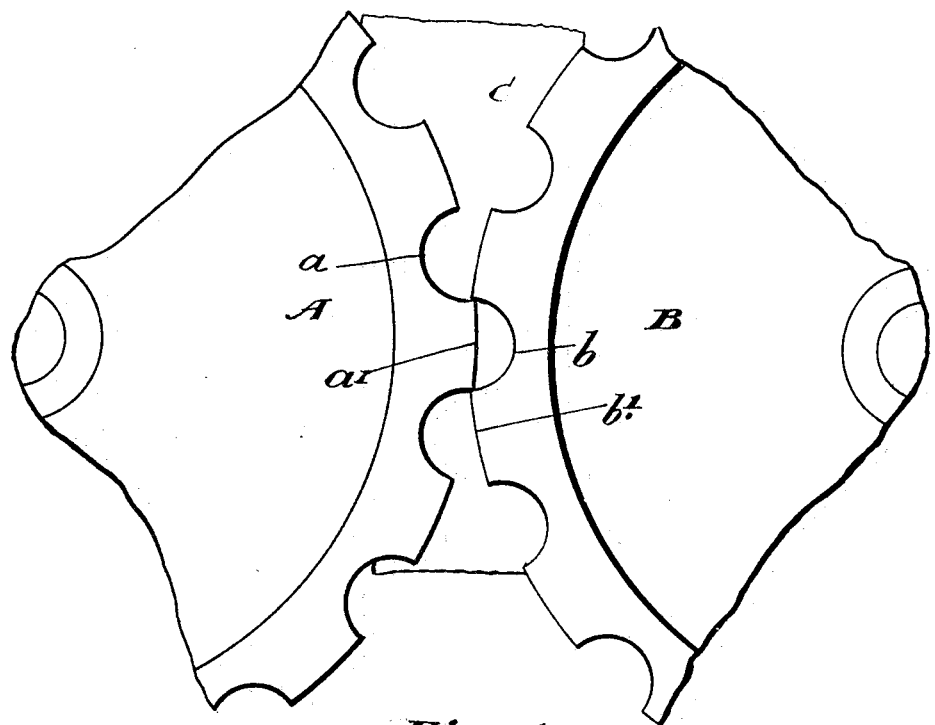
Figure 2:
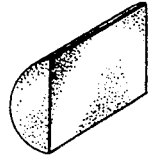

Figure 1 is a side elevation of the substantially tangential portion of the coacting wheels. Fig. 2 is a detail of the block formed.

In the drawings like letters of reference indicate corresponding parts in each figure.

A is one wheel, and B the coacting wheel. The wheel A is provided with arc-shaped recesses $a$ of any suitable depth and length across the peripheral face of the wheel. The recesses $a$ are preferably separated by the circumferential portion $a'$. The wheel B is provided with corresponding recesses $b$ and circumferential portions $b'$. The arc-shaped recesses $b$ of the wheel coact in each case with the circumferential portions $a'$, and the circumferential portions $b'$ coact in each case with the arc-shaped recesses $a$ of the wheel A. Suitable side plates C are used, so that when the peat is fed into the top the block is gradually formed or compressed until it reaches the substantially tangential portions of the two wheels. The recess $a$ and portion $a'$ substantially mesh with the portion $b'$ and the recess $b$, respectively.

The arrangement of the wheels I have shown is most economical and productive; but it will be understood that there may be fewer recesses or the recess of one wheel may coact only with the circumferential portion of the coacting wheel to produce the result which I desire—viz., a semicylindrical block with one arc-shaped side and one straight side and two ends.

In my former machine, patented in the Dominion of Canada under No. 73,483 on the 22d of October, 1901, and in the United States of America under No. 708,574 on the 9th of September, 1902, I have found that the block produced by such machine was such that although the V-shaped recess in one wheel held one portion of the block from displacement as it was being compressed the arc-shaped recess of the opposing wheel permitted such a turning movement of the portion of the block in such recess that practically the greatest compression took place between the upper side of the arc-shaped recess and the side of the V-shaped recess, especially at the point where the release of pressure took place, resulting in a cleavage or breaking away of the two portions of the block on practically a plane coincident with the chord of the arc. By my present invention it will be seen that as the one side of the block is formed practically on a line with the chord of the arc so that no danger of cleavage or breakage is possible.

What I claim as my invention is—

1. In a press for making peat blocks, the combination with a wheel provided with an arc-shaped recess, of a coacting wheel provided with a circumferential portion forming during compression at the tangential points of the wheels substantially the chord of the arc of the arc-shaped recess of the coacting wheel as and for the purpose specified.

2. In a press for making peat blocks, the combination with a wheel provided with an arc-shaped recess, of a coacting wheel having portion of the circumference thereof designed to coact with the arc-shaped recess of the other wheel to form a block as and for the purpose specified.

3. In a press for making peat blocks, the combination with one wheel having arc-shaped recesses and circumferential portions of substantially equal length circumferentially, of a coacting wheel having arc-shaped recesses and circumferential portions of equal length, the arc-shaped recesses of the one wheel being designed to coact with the circumferential portions of the coacting wheel to complete the block at substantially the tangential point as and for the purpose specified.

WILLIAM ATKINSON MILNE.

Witnesses:
 B. BOYD,
 A. S. BATE.